Jan. 1, 1963
P. N. RANDALL ET AL
3,071,152
COMPRESSOR VALVE VIBRATION ABSORBER
Filed March 15, 1960
2 Sheets-Sheet 1
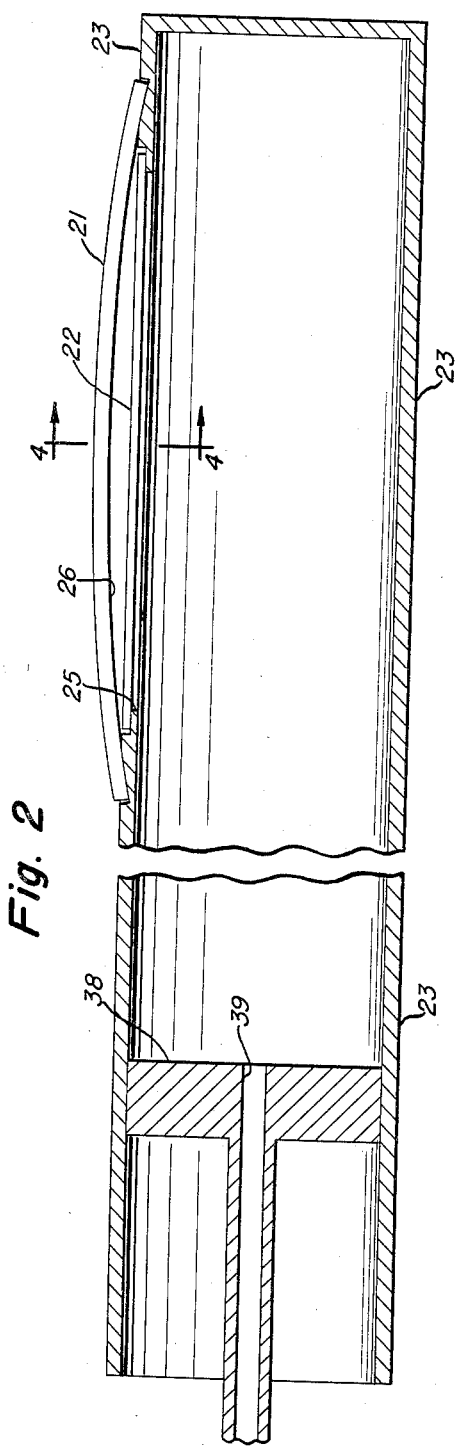
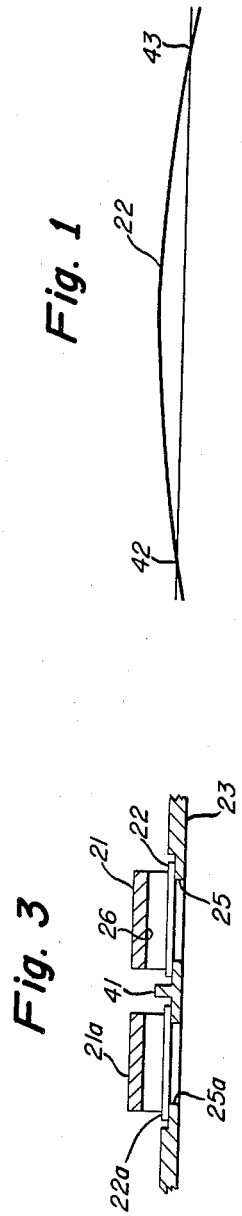
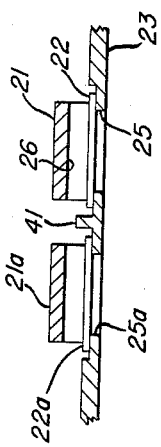
INVENTORS:
Pryor N. Randall
Jay B. Sodowsky
BY
*Gerald Rose*
ATTORNEY Jan. 1, 1963  P. N. RANDALL ET AL  3,071,152
COMPRESSOR VALVE VIBRATION ABSORBER
Filed March 15, 1960  2 Sheets-Sheet 2

INVENTORS:
Pryor N. Randall
Jay B. Sodowsky
BY
Gerald Rose
ATTORNEY

3,071,152
COMPRESSOR VALVE VIBRATION ABSORBER

Pryor N. Randall, Homewood, Ill., and Jay B. Sodowsky, Griffith, Ind., assignors to Standard Oil Company, Chicago, Ill., a corporation of Indiana
Filed Mar. 15, 1960, Ser. No. 15,212
1 Claim. (Cl. 137—512.1)

This invention relates to reciprocating piston type compressors. More particularly it concerns a means for prolonging the life of compressor inlet valves which have resilient metal components.

Reciprocating piston type gas compressors, in which the valves are actuated by pressure differentials across them, commonly experience breakage of resilient metal components of their inlet valves. Not only is valve replacement expensive and time consuming, but it requires that the entire compressor, and perhaps the entire unit which receives compressed gas from the compressor, be shut down for repairs. Although the highest quality materials are employed in making these resilient metal components, they nonetheless tend to break long before either theoretical computations or laboratory flexure test results would indicate as being an effective life.

It has been found that accelerated breakage of resilient metal inlet valve components results from high stresses and repeated flexing of the components due to vibration or "flutter" of these components. Inlet valves, as are well known, contain a plate of either resilient or flexible material which is held in position, usually by spring action or by gravity, above a port until the pressure differential caused by compression is sufficient to lift the plate. Thus valve plates in, say, the inlet valves are designed to flex to the open position once during a piston suction stroke, then straighten out in the closed position, covering the inlet valve port during the compression stroke.

In practice, it has been found that the valve plate, rather than flexing only once per stroke, actually vibrates or "flutters" while in the open position much as the reed of a musical instrument. The maximum amplitude of vibratory flexure may be as much as twice the amplitude of normal flexure; hence the stresses are about doubled by vibration. Moreover, since the natural frequency of the vibrating plate may be 20 or 30 times the frequency of piston reciprocation, these doubled stresses may be applied 20 or 30 times as frequently.

In accordance with the invention, vibratory flutter of compressor inlet valve components is substantially reduced, or even eliminated entirely, by providing the compressor with a chamber communicating with the inlet to the inlet valves, the chamber being of such length as to have a resonant frequency substantially equal to that of the vibratory flutter. By this means, inlet valve components of resilient metal such as helical springs or resilient plates, especially plates in strip form known as "feathers," are enabled to operate without breakage for a period approaching the theoretical or laboratory lifetime.

While I do not wish to be bound by any theory of my invention, it is believed that vibratory flutter is ordinarily caused by a pressure pulse generated in the inlet conduit to an inlet valve by the alternate opening and closing of the inlet port as the valve plate vibrates. For example, when the port is closed momentarily, the flowing air stream is stopped and its pressure rises; this may be observed by installing a pressure indicator in the inlet conduit and, by means of a stroboscopic light, noting the regular occurrence of a pressure pulse shortly after the valve closes. The velocity pressure pulse is roughly sinusoidal, and lags the vibrations by 90 degrees.

Thus it appears that the employment of a resonance chamber communicating with the inlet valve serves to reduce vibratory flutter by reflecting a pressure pulse so that when the valve plate closes the pulse will travel to a remote end of the resonance chamber and back, arriving at the valve port at the instant the valve plate reaches its uppermost position. In other words, the resonance chamber is employed to reflect a pressure pulse which is 180 degrees out of phase with the vibration and hence reduces the vibratory flutter.

The size and shape of this resonance chamber, with the sole exception of its length, appear to be immaterial. However, it has been shown that a length equal to a small odd number of quarter wave lengths (of the sound emitted in the inlet chamber by the fluttering valve plate) provides optimum reduction of flutter. Maximum effectiveness of the resonance chamber is attained with a chamber having a length equal to one-quarter of the wave length, while a chamber ¾ wave length long will still almost completely eliminate flutter. Flutter is even reduced with resonance chamber 5/4 long.

While, as will be shown presently, the invention is applicable to a wide variety of compressors and compressor valves, at present the invention appears to have its maximum utility in compressors having "feather plates" in the inlet valves. These feathers are usually long, flat thin strips of flexible metal which lie atop the inlet port. Several feathers are employed in each valve, and several inlet valves may be associated with each compressor cylinder. Such feather valves are generally excellent, but may nonetheless suffer early breakage due to vibratory flutter.

As noted in the paragraph immediately above, the invention is applicable for a wide variety of compressors employing reciprocating pistons. Such compressors may be either single acting or double acting, single stage or multistage, may have either single or multiple pistons, and may have the pistons in horizontal, vertical or angular alignment. Inlet valves for these pistons are almost exclusively of the plate valve type, employing either a resilient plate or a rigid plate held against the inlet port by means of a pressure from a resilient spring, usually a helical spring.

Following accepted compressor valve terminology (Mechanical Engineers' Handbook, by Lionel S. Marks, fourth edition, pages 1917–18, McGraw-Hill, 1941), most plate valves may be classified into three groups. These are (1) rigidly attached disk valves with integrally connected rings and spring elements (2) semi-attached strip ribbon or "feather valves," and (3) unattached and independent plate valves. Rigidly attached disk valves, exemplified by the Ingersoll channel valves, employ two or more parallel valve plates, each shaped like a channel, which lift uniformly from their seat for their entire length. The back of the channel forms the seat, against which it is held by a flat ribbon spring, bowed against the valve guard at the middle and against the channel at the two ends. Semi-attached strip, feather, or ribbon valves, exemplified by the Worthington feather valve, employ a series of thin flexible strip-like plates of ribbon steel, held in position over rectangular ports in the valve seat by concave guards. Ribbon steel springs may optionally be placed over each valve strip, bonded against the guard at the middle and the valve strip at the ends. In opening, the spring allows the strip to lift uniformly for half its lift, and then flex against the concave guard for the balance of its travel. Unattached and independent plate valves, illustrated by the Chicago Pneumatic valve, employ circular ports over which are placed concentric rings. These rings are semi-flexible, and are held down by means of a number of small helical springs. Many other types of valves are in use, and accordingly the foregoing list is not intended to either be exhaustive or exclusive.

The invention will be described in more detail in the ensuing specification when read in conjunction with the attached drawings wherein:

FIGURE 1 depicts typical vibration patterns of a feather valve.

FIGURE 2 is a sectional elevation of a feather valve installation, showing details of the installation, and which was employed in studying variables of the present invention;

FIGURE 3 is a section taken through a portion through plane 4—4 of a FIGURE 2 type installation;

Figure 4:
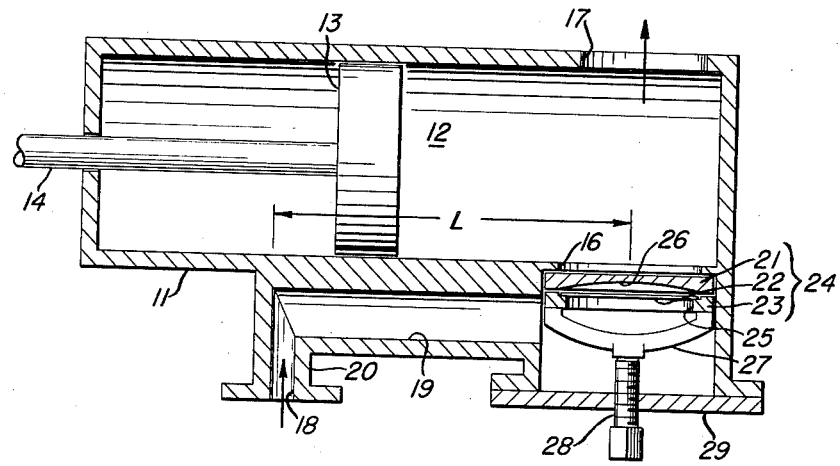
FIGURE 4 depicts schematically an embodiment of the invention where the resonance chamber comprises a portion of an inlet conduit to the inlet valve and where the inlet to the resonance chamber is of restricted cross sectional area.

Turning first to FIGURE 1, a feather or strip plate valve vibration pattern is shown. This pattern is intermediate between that of a "free-free" beam, which has nodes at approximately the quarter points, and that of a "hinged-hinged" beam, which has nodes at the ends. Feather 22 however is mounted at each end in such a way that the nodes 42 and 43 are a short distance from the ends. Thus, in addition to its length, thickness, and modulus of elasticity, the natural period of vibration of feather plate 22 is dependent at least to some extent, on the manner of mounting its ends. In a new Worthington compressor, it has been found that the period of vibration is about intermediate the periods for a "free-free" and a "hinged-hinged" beam. For example, a long strip of 11–13 chromium steel in the hardened condition, having dimensions of 0.0415 in. thick by 5.41 in. long by 0.500 in. wide has a natural frequency of 7,800 cycles per minute when acting as a "hinged-hinged" beam, and 17,600 cycles per minute when acting as a "free-free" beam. It was found by test that the flutter frequency ranged from 10,600 cycles per minute at a gas flow of 49 cubic feet per minute, to 11,500 cycles per minute at 73 cubic feet per minute. This also indicates that the vibration modes may change somewhat in response to pressure differential across the feather plate.

Accordingly, resonance chambers having a length equal to ¼, ¾, 5/4, etc., of the wave length of the sound emitted by the feather plate (as determined under the conditions of the gas at the inlet to the valve) will effectively reduce or even entirely eliminate flutter. Actually, this length may vary within plus or minus 10 or even plus or minus 20% in the case of feather plate valves since they are somewhat free to change their nodular points.

Turning now to FIGURE 2, an enlarged sectional view of a feather plate valve installation is shown. In the figure, feather plate 22 is a resilient strip of 11–13 chromium steel in the hardened state, illustratively having the dimensions of ½" wide by 5" long by 0.040" thick. Guard 21 has a concave-inward surface 26 to prevent excessive movements of feather plate 22 when in its open condition. Guard 21 has 0.010" clearance above the ends of feather plate 22, and about ¼" clearance at the center. In the installation shown, the valve body comprises a tube 23 which constitutes the valve seat, the tube being a 2" pipe and equipped with a movable piston 38 with a conduit 39 for admitting inlet gas (in this case air) to vibrate the feather plate 22.

By passing high pressure air through inlet 39 and into the chamber defined by pipe 23, it was found that the feather plate had a natural frequency of about 170 cycles per second. When piston 38 was adjusted to provide about a 20" distance from the center of feather plate 22, corresponding to about ¼ the wave length, flutter was almost entirely reduced. Similarly, lengths of 60" (¾ wave length) and 100" (5/4 wave length) also reduce flutter.

In the absence of flutter, the center portion of feather plate 22 does not touch guard 21; with flutter presnet it usually contacts concave surface 26. In the absence of a resonance chamber, flutter may begin spontaneously, although this is not necessarily so. There is no evidence of higher harmonics superimposed on the fundamental frequency.

In a series of experiments employing an installation similar to that shown in FIGURE 2, air was continuously admitted via inlet conduit 39 and exhausted through inlet port 25 of the installation. Studies were made of the correlation between pressure fluctuations in the resonance chamber, position of piston 38 and flutter or absence of flutter in feather plate 22. This provided confirmation as to the requisite length of the chamber as well as elucidated the flutter phenomena.

Turning now to FIGURE 3, a partial cross section of the type of installation depicted in FIGURE 2 is shown. Inlet port 25 of tube 23 is duplicated by a similar port 25a, and, as in the case of inlet port 25, is covered by feather plate 22a which in turn is guarded by guard 21a.

It has further been found in accordance with the invention that when a plurality of feather plates are employed in the same inlet valve, the plates may vibrate at 180 degrees out of phase. Accordingly, the installation of ridge 41 between adjacent feather plates 22 and 22a is employed. Ridge 41 is at least as high as the thickness of each feather plate, and should extend for a length at least equal to the length of inlet port 25. Ridge 41 causes the adjoining plates 22 and 22a to vibrate in phase, so that the reflected pressure pulse from a resonance chamber can damp all of the feather plates simultaneously. Otherwise, the pressure pulse could damp the flutter of one plate while actually aggravating the flutter of another.

Actually dimensions and shape of the resonance chamber are not critical. It is preferably cylindrical, but may have bends, side entries, and may be of non-circular cross section, e.g. rectangular. Resonance chambers with either closed ends and a side entry, or with an entry conduit at an entirely different location are as effective as resonance chambers which merely comprise an enlarged portion of the inlet conduit. If a cylindrical chamber is employed, optimum practice constitutes using a cylinder having a diameter ranging from ¼ to 1/10 of the wave length.

If the cylinder comprises an enlarged portion of the inlet conduit (or in other words, if the inlet conduit is reduced in cross sectional areas before entering the resonance chamber), a restriction in cross sectional area of as little as 4 to 1 may be used, although superior results are achieved with an area ratio of about 6 to 1. Alternatively, in lieu of conduits having different diameters, a perforated disk wherein the unperforated portions have an area ratio to the perforated portions of about 7 to 1 (although this figure may vary from 4 to 1 to about 10 to 1) affords satisfactory restriction for the establishment of a resonance chamber.

It has also been found that the resonance chamber need not be straight. Elbows or even plugged T's apparently do not reflect the pressure pulse.

Referring to FIGURE 4, a schematic sectional view of a reciprocating piston type gas compressor embodying the inventive chamber 19 is shown. The compressor comprises cylinder 12, through which moves piston 13 which is connected via shaft 14 to a suitable reciprocating shaft drive. Cylinder 12, with walls 11, has an inlet 16 and an outlet 17; both inlet and outlet have valves although for simplicity and clarity the outlet valves are deleted from FIGURE 4.

Inlet valve 24 comprises guard 21 having concave surface 26, feather plates 22, seat 23, and inlet port 25. Valve 24 is held in position against walls 11 of cylinder 12 by means of yoke 27, which is compressed via jam screw 28 tanned into cap 29.

The resonance chamber 19 in this instance comprises a portion of the inlet conduit 18 to the inlet valve 24. Inlet 20 to resonance chamber 19 is of restricted cross sectional area, e.g., 4:1 area ratio, to afford effectively a closed end resonance chamber. The length L of resonance chamber 19 from the "closed end" at inlet 20 to the center of feather plate 22 is ¼ the wave length of the sound emitted in the inlet chamber by the flutter of feather plate 22.

The embodiment of FIGURE 4 is of primary advantage for use with newly constructed compressors which embody the inventive principles. However, there is also provided in accordance with the invention an embodiment which is particularly applicable for modifying compressors now in use.

Figure 5:
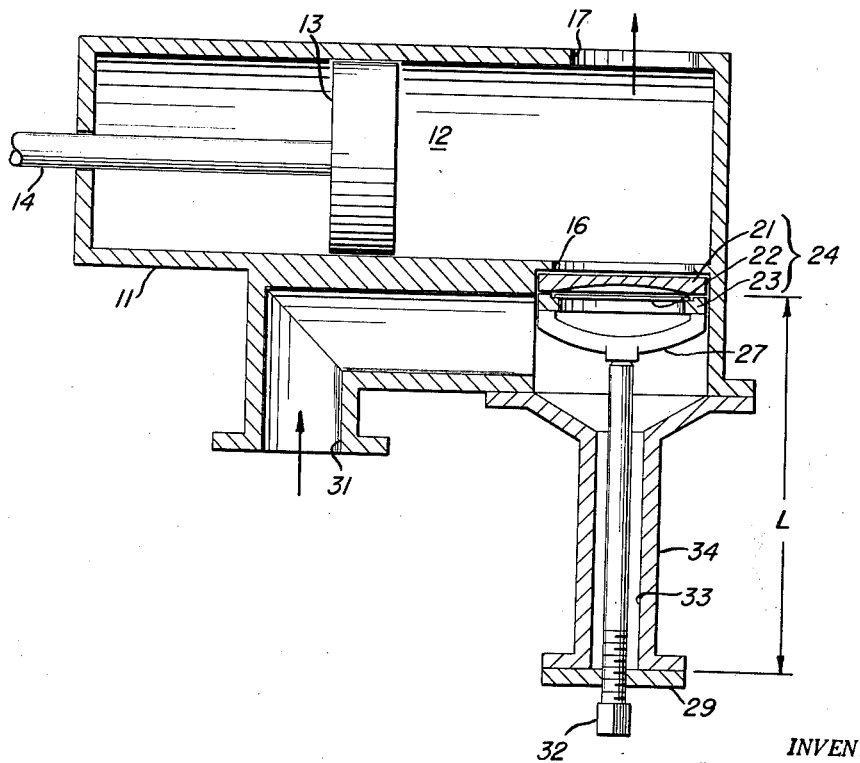
FIGURE 5 shows an alternative embodiment where the resonance chamber comprises a closed-end extension for the inlet valve.

This latter embodiment, depicted in FIGURE 5, comprises a closed-end extension of cap 34 for the inlet valve 24. Cap 34 is so sized that the resonant frequency of the contained gas is substantially equal to that of the natural frequency of feather plate 22. In this embodiment, jam screw 32 secures yoke 27 in the previously described manner, and is tapped into plate 29. Thus there is no modification of the compressor body itself.

Other constructions which will afford a resonance chamber effectively communicating with the inlet to the inlet valves may alternatively be employed, and it is not intended that the foregoing embodiments be exclusive. A particularly useful modification, either to the embodiments depicted above or to other embodiments, is to provide a movable end plate in the resonance chamber, whereby the chamber can be "tuned" to a length effective to reduce flutter. In the case of a FIGURE 4 type installation, this end plate may be a perforated plate, movable by means of a suitable jack screw.

The employment of the inventive resonance chamber appears to offer numerous advantages over prior art methods of reducing vibration. The installation of a screen or other resistance immediately up stream of an inlet valve will ordinarily dampen flutter, but at the expense of materially raising the pressure drop, and hence reducing the efficiency, across the valve.

It has also been discovered in the present investigation that corrosion intensively aggravates the valve breaking problem. Accordingly, even when such normally corrosion resistant materials as 11–13 chromium steel are employed as resilient valve components, it is desirable to maintain an oil vapor feed into the inlet so as to prevent any corrosion whatsoever.

From the foregoing presentation, it is evident that the objects of this invention have been fully satisfied. There has accordingly been provided a system for substantially reducing flutter of inlet valve components which are made of resilient metal, which system requires minimum installation and which affords maximum protection. While the invention has been described in connection with particular embodiments thereof, it is evident that many modifications, variations and alternatives will be apparent to those skilled in the art in light of my description, and accordingly it is intended to embrace all of these as fall within the spirit and broad scope of the invention.

We claim:

For a reciprocating piston type compressor having a plurality of strip-form inlet valve plates of resilient metal disposed above a plurality of inlet ports wherein said plates are subject to breakage resulting from high stresses and repeated flexing due to vibratory flutter, the improvement whereby said flutter is substantially reduced which comprises, in combination, a chamber communicating with the inlet to the inlet valve and of a length substantially equal to one of ¼, ¾, and 5/4 wave lengths of the vibration induced in the gas by the fluttering component, whereby said chamber reflects a pressure pulse which is 180° out of phase with the vibratory flutter of said plates, and ridges disposed between adjacent plates and extending above said inlet ports for a distance at least as high as the thickness of said strip-form inlet valve plates and of a length at least equal to the length of said inlet ports whereby the reflected pressure pulse from said chamber dampens all plates simultaneously.

References Cited in the file of this patent

UNITED STATES PATENTS

| 2,431,733 | Crittenden | Dec. 2, 1947 |
| 2,599,499 | Thorstenson | June 3, 1952 |
| 2,620,125 | Kilchenmann | Dec. 2, 1952 |

FOREIGN PATENTS

| 304,033 | Great Britain | Jan. 17, 1929 |
| 555,944 | Great Britain | Sept. 14, 1943 |